United States Patent
Jeon et al.

(10) Patent No.: US 9,454,038 B2
(45) Date of Patent: Sep. 27, 2016

(54) DISPLAY DEVICE INCLUDING ADHESIVE SHEET ATTACHED TO BOTTOM CHASSIS

(71) Applicant: SAMSUNG DISPLAY CO., LTD., Yongin, Gyeonggi-Do (KR)

(72) Inventors: Sang-Hyun Jeon, Seoul (KR); Gyung-Kook Kwak, Seoul (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 0 days.

(21) Appl. No.: 14/311,904

(22) Filed: Jun. 23, 2014

(65) Prior Publication Data

US 2015/0085471 A1    Mar. 26, 2015

(30) Foreign Application Priority Data

Sep. 23, 2013   (KR) .................... 10-2013-0112776

(51) Int. Cl.
*G02F 1/13357* (2006.01)
*G02F 1/1335* (2006.01)
*F21V 8/00* (2006.01)
*G02F 1/1333* (2006.01)

(52) U.S. Cl.
CPC ....... *G02F 1/133608* (2013.01); *G02B 6/0081* (2013.01); *G02F 1/133308* (2013.01); *G02F 2001/133314* (2013.01); *G02F 2202/28* (2013.01)

(58) Field of Classification Search
CPC ............ G02B 7/00; G02B 6/0013–6/33; G02F 1/133608; G02F 1/133308; G02F 2001/133314
USPC ................................. 362/97.1–97.3
See application file for complete search history.

(56) References Cited

U.S. PATENT DOCUMENTS

| | | | |
|---|---|---|---|
| 6,801,268 B2* | 10/2004 | Huang | G02F 1/133308 349/58 |
| 7,852,424 B2* | 12/2010 | Sugawara | G02F 1/133308 349/122 |
| 2008/0067933 A1* | 3/2008 | Wang et al. | 313/512 |
| 2008/0303971 A1* | 12/2008 | Lee et al. | 349/58 |
| 2009/0002598 A1* | 1/2009 | Choo et al. | 349/62 |
| 2009/0027584 A1* | 1/2009 | Han | G02F 1/133608 349/58 |
| 2009/0168318 A1* | 7/2009 | Moon et al. | 361/679.21 |
| 2011/0007230 A1* | 1/2011 | Yamamoto et al. | 348/794 |
| 2013/0003339 A1* | 1/2013 | Chen | H05K 5/02 361/807 |
| 2013/0038809 A1* | 2/2013 | Hung | G02F 1/133308 349/58 |
| 2013/0050820 A1* | 2/2013 | Shin | G06F 1/1601 361/679.01 |
| 2013/0263488 A1* | 10/2013 | Wu | G02B 6/0088 156/305 |
| 2014/0125902 A1* | 5/2014 | Lee et al. | 349/43 |
| 2014/0146513 A1* | 5/2014 | Choi | G02F 1/133308 362/19 |

FOREIGN PATENT DOCUMENTS

| | | |
|---|---|---|
| JP | 5159485 | 12/2012 |
| KR | 10-2008-0035755 A | 4/2008 |
| KR | 10-2013-0017477 A | 2/2013 |
| KR | 10-2013-0046240 A | 5/2013 |

* cited by examiner

*Primary Examiner* — Mariceli Santiago
(74) *Attorney, Agent, or Firm* — Lee & Morse, P.C.

(57) ABSTRACT

A display device includes a bottom chassis, a backlight unit accommodated in the bottom chassis, a display panel above the backlight unit, and an adhesive sheet between the backlight unit and the display panel. The display panel is attached to the bottom chassis through the adhesive sheet.

9 Claims, 6 Drawing Sheets

DISPLAY DEVICE INCLUDING ADHESIVE SHEET ATTACHED TO BOTTOM CHASSIS

CROSS-REFERENCE TO RELATED APPLICATION

Korean Patent Application No. 10-2013-0112776, filed on Sep. 23, 2013, in the Korean Intellectual Property Office, and entitled: "Display Device," is incorporated by reference herein in its entirety.

BACKGROUND

1. Field

Embodiments relate to a display device.

2. Description of the Related Art

A display device is classified into an emissive display device that displays a light information signal by self-emission and a non-emissive display device that displays a light information signal by controlling ambient light (i.e., (light modulation)). Among non-emissive display devices, a liquid crystal display (LCD) has been widely used.

The liquid crystal display forms an electric field by filling a liquid crystal material between an upper substrate where a common electrode, a color filter, and the like are formed and a lower substrate where a thin film transistor, a pixel electrode, and the like are formed and applying different potentials respectively to the pixel electrode and the common electrode to change alignment of liquid crystal molecules, and displays an image by controlling light transmittance through the change of the alignment of the liquid crystal molecules.

SUMMARY

Embodiments are directed to a display device including a bottom chassis, a backlight unit accommodated in the bottom chassis, a display panel above the backlight unit, and an adhesive sheet between the backlight unit and the display panel. The display panel is attached to the bottom chassis through the adhesive sheet.

The bottom chassis may include a flat bottom portion forming a bottom surface of the bottom chassis, a first side wall portion extending upwardly from the flat bottom portion in a direction substantially perpendicular to the flat bottom portion, a second side wall portion extending downwardly from the first side wall portion substantially parallel to the first side wall portion, an attachment portion extending inwardly from the second side wall portion in a substantially horizontal direction, and a third side wall portion extending downwardly from the attachment portion in a direction substantially perpendicular to the attachment portion.

One side of the adhesive sheet may adhere to a peripheral area of the display panel, and another side of the adhesive sheet may adhere to the attachment portion of the bottom chassis.

The attachment portion of the bottom chassis may be substantially parallel to the display panel.

An upper surface of the attachment portion may be located about even with or slightly higher than the upper surface of the backlight unit.

The first side wall may extend to a height that is about even with or lower than the upper surface of the display panel.

In the third side wall portion of the bottom chassis, an inward surface may contact or almost contact the backlight unit.

A height of a corner where two edges of the bottom chassis meet may be higher than the height of the attachment portion.

The bottom chassis may include a flat bottom portion forming a bottom surface of a bottom chassis, a first side wall portion extending upwardly from the flat bottom portion in a direction substantially perpendicular to the flat bottom portion, an attachment portion extending inwardly in a substantially horizontal direction from the first side wall portion, and a second side wall portion extending downwardly from the attachment portion in a direction substantially perpendicular to the attachment portion.

The attachment portion of the bottom chassis may be substantially parallel to the display panel.

An upper surface of the attachment portion may be located about even with or slightly higher than the upper surface of the backlight unit.

At least one edge of the bottom chassis may include a first hemming structure including a flat bottom portion forming a bottom surface of the bottom chassis, a first side wall portion extending upwardly from the flat bottom portion in a direction substantially perpendicular to the flat bottom portion, a second side wall portion extending downwardly from the first side wall portion substantially parallel to the first side wall portion, an attachment portion extending inwardly in a substantially horizontal direction from the second side wall portion, and a third side wall portion extending downwardly from the attachment portion in a direction substantially perpendicular to the attachment portion. At least one other edge of the bottom chassis may include a second hemming structure including a flat bottom portion forming the bottom surface of the bottom chassis, a first side wall portion extending upwardly from the flat bottom portion in a direction substantially perpendicular to the flat bottom portion, an attachment portion extending inwardly in a substantially horizontal direction from the second side wall portion, and a third side wall portion extending downwardly from the attachment portion in a direction substantially perpendicular to the attachment portion.

A driving circuit substrate that transmits signals for driving the display panel may be located in an edge of the bottom chassis including the second hemming structure.

Both sides of the adhesive sheet may have adhesive properties. The adhesive sheet may be in a shape of a rectangular having only edge portions and having a size that almost corresponds to the size of the display panel.

The adhesive sheet may be made of a non-transmissive material.

The adhesive sheet may be in a form of double-sided strips attached to four edges of the display panel.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
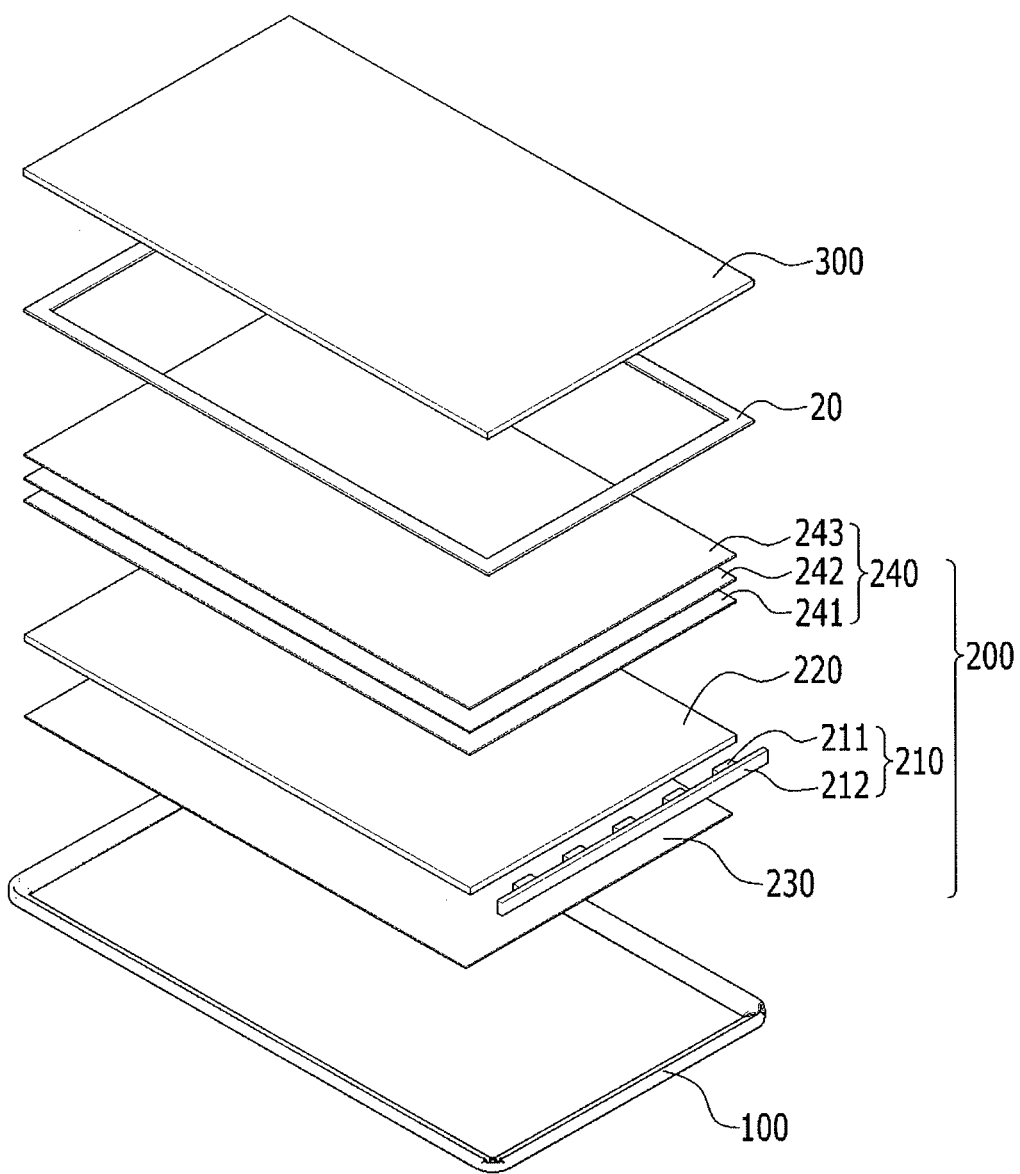
FIG. 1 illustrates an exploded view of a display device according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Hereinafter, a display device according to an exemplary embodiment will be described in detail with reference to the accompanying drawings. Even though liquid crystal display (LCD) is mainly exemplified in the following description, embodiments may be applicable with respect to other display devices using a backlight, such as an electrophoretic display (EPD).

FIG. 1 illustrates an exploded view of a display device according to an exemplary embodiment.

The display device may include a bottom chassis 100, a backlight unit 200 received in the bottom chassis 100, a display panel 300 provided in an upper side of the backlight unit 200, and an adhesive sheet 20 provided between the backlight unit 200 and the display panel 300.

The bottom chassis 100 may be formed in the shape of a cuboidal box having an open upper side, and thus may include a receiving space having a predetermined depth therein. The bottom chassis 100 may include a flat bottom portion that is the bottom surface of a chassis, and a side wall portion that extends upward from four edges of the flat bottom portion. The bottom chassis 100 may include portions that extend substantially in parallel toward the inside from the side wall. Throughout the specification, "toward the inside" refers to a direction toward the center of the bottom chassis 100. The backlight unit 200, which provides light to the display panel 300, may be received in the receiving space.

The bottom chassis 100 may be made of a metallic material such as aluminum, an aluminum alloy, coated steel, or the like, as examples. The bottom chassis 100 may be, for example, formed by bending edges of a metal plated to the inside. Such a treatment is called hemming. An edge structure of the bottom chassis formed by the hemming will be referred to herein as a hemming structure. Herein, terms such as "almost," "substantially," "about," and the like, with respect to dimensions and directions of the bottom chassis 100, may be interpreted in the context of the bottom chassis 100 being formed by bending of the metallic material.

The backlight unit 200 may include a light source unit 210 that generates light, a light guide plate (LGP) 220 having one edge disposed adjacent to the light source 210, a reflective sheet 230 provided in a lower side of the LGP 220, and a plurality of optical sheets 240 provided in an upper side of the LGP 220.

As a light source, the light source unit 210 may include a light emitting diode (LED) package 211 and a substrate 212 where the LED package 211 is mounted. The substrate 212 may supply external power to the LED package 211. Light emitted from the light source unit 210 may enter a side surface of the LGP 220 and then may be emitted to upper and lower portions through the LGP 220.

FIG. 1 exemplarily illustrates that the light source unit 210 may be provided at one side of the LGP 220. In other implementations, the light source unit 210 may also be provided at the other side that is opposite to one side of the LGP 220, or may be provided at all of the four edges of the LGP 220. The light source unit 210 may be provided at only one side of the LGP 220 in a small mobile device such as a smart phone.

The LED package 211 is described as an example of the light source in the present exemplary embodiment. In other implementations, a cold cathode fluorescent lamp (CCFL) may be used as the light source. In addition, the light source unit 210 is illustrated in FIG. 1 as being an edge type disposed at a side surface of the light guide plate 220, but in other implementations, the light source unit 210 may be a direct type disposed at a lower side of the light guide plate 220. When the light source unit 210 is a direct type, an optical lens may be disposed on the light source such as an LED package to refract light instead of using a light guide plate.

The light guide plate 220 may be made of a poly(methyl methacrylate) (PMMA) having high light transmittance. In other implementations, methylstyrene (MS) having excellent heat resistance and humidity resistance may be used. The light guide plate 220 may change light having an optical distribution of a dot or linear light source, generated by the light source unit 210, to light having an optical distribution of a surface light source. That is, the light guide 220 may evenly distribute light. As the light guide plate 220, a wedge-type plate or a flat-type plate may be used, and one surface or both surfaces thereof may have patterns, as examples.

The reflective sheet 230 provided at a lower side of the light guide plate 220 may be used to increase light efficiency. The reflective sheet 230 may substantially reflect light moving toward a lower side of the light guide plate 220 to be directed toward an upper side thereof. The reflective sheet 230 may be formed of a white reflective film or a silver reflective film. The reflective sheet 230 may be provided between the bottom chassis 100 and the light guide plate 220, or may be attached to the bottom chassis 100 by an adhesive material, a double-side tape, or the like.

The optical sheet 240 provided at the upper side of the light guide plate 220 may include a diffuser sheet 241, a prism sheet 242, and a reflective polarization sheet 243. The diffuser sheet 241 may diffuse light emitted from the light guide plate 220 to equalize luminance distribution. The prism sheet 242 may cause light to become perpendicular to the display panel 300 by controlling a movement direction of the light diffused by the diffuser sheet 241. The reflective polarization sheet 243 may be used to increase light efficiency of the display device. The reflective polarization sheet 243 may be called a luminance enhancement film.

The optical sheet 240 may include only some of the sheets 241, 242, and 243, may include a plural number of one of the sheets 241, 242, and 243, may further include an optical sheet having other features, or may include a protective sheet.

The display panel 300 displaying an image may be disposed on an upper side of the optical sheet 240. One surface of the adhesive sheet 20 may be attached to the bottom surface at the edge sides of the display panel 300. The other surface of the adhesive sheet 20 may be attached to the bottom chassis 100. Unlike a general display device, the display device according to the exemplary embodiment does not include a mold frame. Thus, the display panel 300 may be attached to the bottom chassis 100 rather than being attached to the mold frame.

Both sides of the adhesive sheet 20 may have adhesive properties. The size of the adhesive sheet 20 may almost correspond to the size of the display panel 300, except that the adhesive sheet 20 may include only edge portions. For example, the adhesive sheet may be formed in the shape of a rectangle that does not include a center portion. The adhesive sheet 20 may be formed as a stripe of a material such as a double-sided adhesive tape. For example, four stripes may be attached to the four edges of the display panel 300. The adhesive sheet 20 may be made of a non-transparent material. For example, the adhesive sheet 20 may be formed by coating an adhesive material to both sides of a dark film. The adhesive sheet 20 may be made of a material having a buffering capacity, such as a material having elasticity.

The adhesive sheet 20 provided between the backlight unit 200 and the display panel 300 may be partially overlapped or not be wholly overlapped with the backlight unit 200.

A top chassis that surrounds a rim of the display panel 300 may be provided in an upper side of the display panel 300.

Hereinafter, a detailed configuration of the display panel 300 and the bottom chassis 100, more particularly, how the display panel 300 is attached to the bottom chassis 100 through the adhesive sheet 20, will be described with reference to FIG. 2 to FIG. 5.

Figure 2:
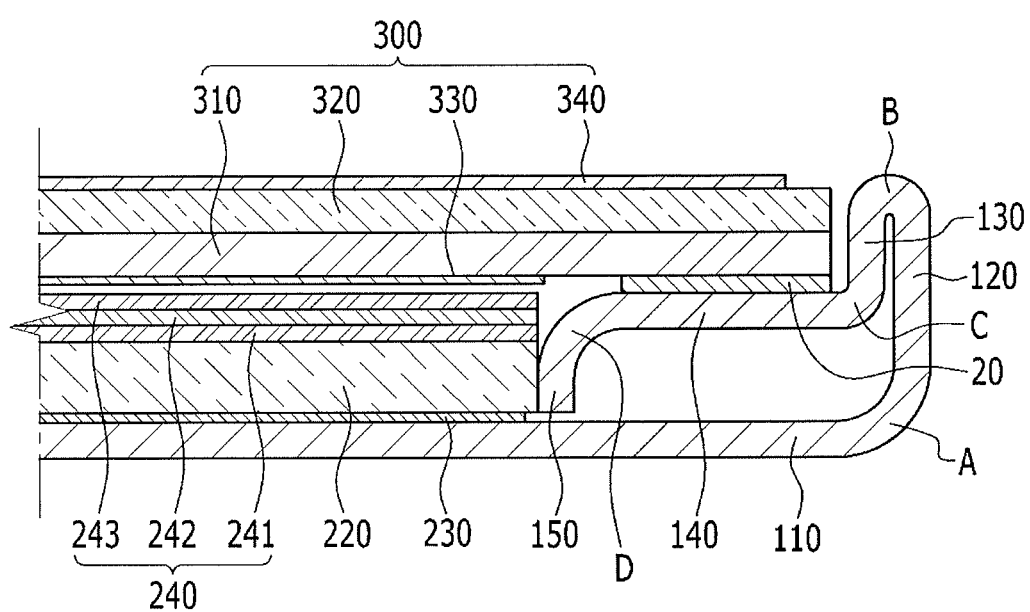
FIG. 2 illustrates a cross-sectional view of one example of a portion around an edge where a light source is not disposed in the display device of FIG. 1.
Figure 3:
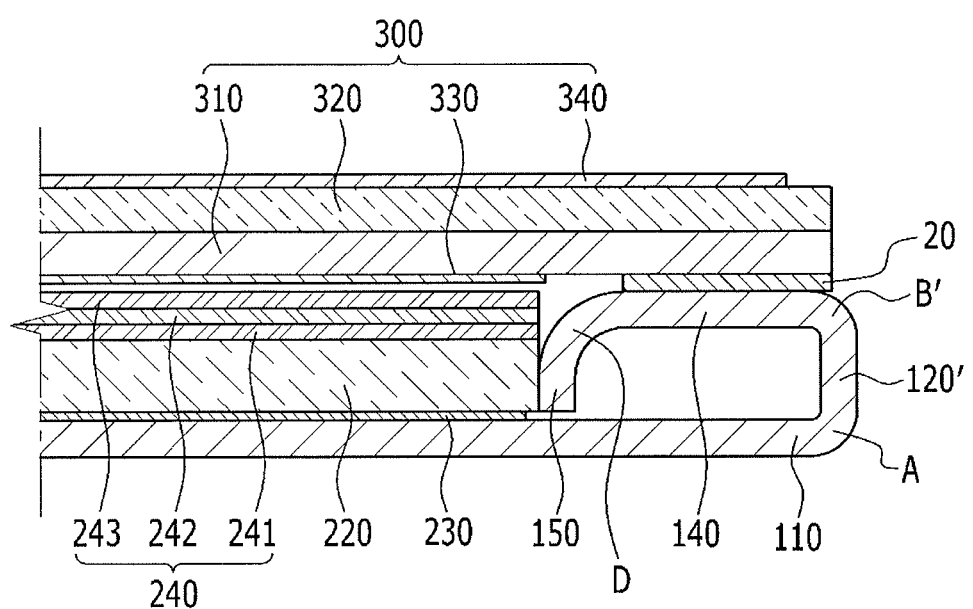
FIG. 3 illustrates a cross-sectional view of another example of a portion around the edge where the light source is not disposed in the display device of FIG. 1.

FIG. 2 illustrates a cross-sectional view depicting an example of an edge where the light source is not disposed in the display device of FIG. 1, and FIG. 3 illustrates a cross-sectional view of another example of an edge where the light source is not disposed in the display device of FIG. 1.

Referring to FIG. 2, the bottom chassis 100 may have a structure in which four edges thereof are bent in four portions. Such a bent structure may be formed by bending one metal plate. Hereinafter, the four bent portions will be referred to as first to fourth bent portions A, B, C, and D. By the bent portions, the bottom chassis 100 may be divided into a flat bottom portion 110, an external side wall portion 120, a middle side wall portion 130, an attachment portion 140, and an internal side wall portion 150.

The flat bottom portion 110 may be a portion that substantially limits the size of the bottom chassis 100 and forms the bottom surface. The backlight unit 200 including the reflective sheet 230, the light guide plate 220, and the optical sheet 240 may be provided on the flat bottom portion 110. The optical sheet 240 may include the diffuser sheet 241, the prism sheet 242, and the reflective polarization sheet 243.

The flat bottom portion may be bent at the first bent portion A to form the external side wall portion 120 extending upwardly from the flat bottom portion 110 in a substantially perpendicular direction to the flat bottom portion 110. The external side wall portion 120 may substantially limit the height of the bottom chassis 100. The height of the external side wall portion 120 may be lower than or almost equivalent to the level of the upper surface of the display panel 300.

The external side wall portion 120 may be bent toward the inside at the second bent portion B to form the middle side wall portion 130 extending downwardly substantially in parallel with the external side wall portion 120. The middle side wall portion 130 may be shorter than the external side wall portion 120. A space where the display panel 300 is located may be limited by the middle side wall portion 130. Edge portions of the display panel 300 may be protected from damage.

The middle side wall portion 130 may be bent toward the inside at the third bent portion C to form the attachment portion 140 extending toward the inside in a substantially horizontal direction from the middle side wall portion 130. The attachment portion 140 may be substantially parallel to the flat bottom portion 110. The attachment portion 140 may be a portion where the display panel 300 is attached to the bottom chassis 100. The display panel 300 may be attached at several portions of the bottom chassis 100. The upper surface of the attachment portion 140 may be substantially parallel with or higher than the upper surface of the optical sheet 240. The attachment portion 140 may be parallel or almost parallel with the display panel 300 so as to ensure as wide as possible an attachment area.

The attachment portion 140 may be bent at the fourth bent portion D to form the internal side wall portion 150 extending downwardly in a substantially perpendicular direction from the attachment portion 140. The internal side wall portion 150 may be parallel or almost parallel to the external side wall portion 120 and the middle side wall portion 130. The sum of the length of the internal side wall portion 150 and the length of the middle side wall portion 130 may be equivalent or almost equivalent to the length of the external side wall portion 120. An end (i.e., an edge) of the internal side wall portion 150 may contact or may almost contact the flat bottom portion 110. A surface of the internal side wall portion 150 facing toward the inside may contact the end of the light guide plate 220.

The edge portion of the bottom chassis 100 may be formed with the hemming structure. Accordingly, the strength of the bottom chassis 100, particularly, the strength of a bent portion of the bottom chassis 100, may be enhanced and durability against an external impact may also be enhanced. A structure for reinforcing the strength of the display device may not be additionally needed. The thickness of the display device may be reduced and the bezel may be made thinner or may be eliminated.

The display panel 300 provided on the backlight unit 200 may include a lower substrate 310 and an upper substrate 320 made of transparent substrate materials such as glass and may be disposed opposite to each other.

A thin film transistor (TFT), a pixel electrode, and the like may be formed on an upper surface of the lower substrate 310. A source terminal of the thin film transistor may be connected with a data line, a gate terminal may be connected with a gate line, and a drain terminal may be connected with the pixel electrode. The lower substrate 310 may also be called a thin film transistor substrate.

A common electrode, a color filter, a light blocking member, or the like may be formed in a lower surface of the upper substrate 320. In other implementations, at least one of the common electrode, the color filter, and the light blocking member may be formed in the lower substrate 310 depending on a type of the display panel. In the exemplary embodiment, the upper substrate 320 may be a thin film transistor substrate.

The lower substrate 310 and the upper substrate 320 may be bonded to each other, and a liquid crystal material may be filled between the two substrates 310 and 320 by dripping or injection. When an electric signal is applied to a gate line and a source line of the thin film transistor of the lower substrate 310, thereby turning on the thin film transistor, an electric field may be formed between the pixel electrode of the lower substrate 310 and the common electrode of the upper substrate 320. Due to such an electric field, alignment of liquid crystal molecules existing between the lower substrate 310 and the upper substrate 320 may be changed and light transmittance may also be changed in accordance with the changed alignment, thereby displaying a desired image.

The display panel 300 may further include polarization films 330 and 340 respectively in the lower surface of the lower substrate 310 and the upper surface of the upper substrate 320. The polarization films 330 and 340 may polarize light incident to the display panel 300.

One side of the adhesive sheet 20 made of a non-transmissive material may be attached to a bottom surface near the edge of the display panel 300, and the other side of the adhesive sheet 20 may be attached to the attachment portion 140 of the bottom chassis 100. The display panel 300 may be attached to the bottom chassis 100 simply by the adhesive sheet 20 and then may be fixed to a desired location while being attached to the bottom chassis 100.

The backlight unit 200 may be located in a space limited by the bottom chassis 100 and the display panel 300 attached to the bottom chassis 100

A gap that may exist between the bottom chassis 100 and the display panel 300 may be filled by the adhesive sheet 20. Therefore, light of the backlight unit 200 may not leak to the edge side of the display panel 300. For example, when a mold frame is used, light may leak through a gap between the bottom chassis and the mold frame. However, in the exemplary embodiment, a mold frame is not used, and accordingly, light leakage may be prevented and a space for the mold frame may be reduced so that the thickness of the display device and the width of the bezel may be reduced.

The bent portion B of the bottom chassis 100 may be bent by about 180 degrees. The sum of the thickness of the external side wall 120 and the thickness of the middle side wall 130 may be almost two times that of the metal plate, which is a material of the bottom chassis 100. The width of the bezel may be reduced by adjusting the edge of the display panel 300 to almost merge with the middle side wall 130.

FIG. 3 illustrates a bottom chassis 100 having a bent structure that is different from the structure of the bottom chassis of FIG. 2. Unlike the bottom chassis of FIG. 2 having the structure where bending occurs four times, the bottom chassis 100 of the present exemplary embodiment may be a structure where bending occurs three times. In comparison with FIG. 2, like constituent elements are designated by like reference numerals, and modified constituent elements are designated by like reference numeral with apostrophes. Such a reference numeral rule may be applied to all exemplary embodiments.

A flat bottom portion 110 of a bottom chassis 100 may be bent at a first bent portion A to extend upwardly to form an external side wall portion 120'. The external side wall portion 120' may extend upwardly to a height that is only approximately equal to or slightly higher than a level of an upper surface of a backlight unit 200. The external side wall portion 120' may be bent at a second bent portion B' to form an attachment portion 140 that extends toward the inside. An upper surface of an attachment portion 140 may extend toward the inside substantially in parallel with the flat bottom portion 110 and may be approximately in parallel with or slightly higher than the upper surface of the backlight unit 200.

The attachment portion 140 may be bent at a fourth bent portion D to form an internal side wall portion 150 that extends downwardly in a substantially perpendicular direction from the attachment portion 140. Thus, the length of the internal side wall portion 150 may be the same or almost the same as the length of the external side wall portion 120 (more particularly, a length acquired by subtracting the thickness of the metal plate). An end of the internal side wall portion 150 may contact or almost contact the flat bottom portion 110. A surface of the internal side wall portion 150 toward the inside may contact an end of the light guide plate 220.

By such a hemming structure, the strength of the bottom chassis may be enhanced and impact durability may be increased.

The display panel 300 may be attached to the attachment portion 140 of the bottom chassis 100 by an adhesive sheet 20. The backlight unit 200 may be provided in a space formed by the bottom chassis 100 and the display panel 300 attached to the bottom chassis 100. Unlike the exemplary embodiment of FIG. 2, a portion protruding upward does not exist at an outer side of the attachment portion 140. An end of the display panel 300 may be located closer to the end of the bottom chassis 100. The width of the bezel may be reduced by as much as or greater than the thickness of the metal plate. Leakage of light of the backlight unit 200 to the end side of the display panel 300 may be prevented by the adhesive sheet 20.

In one bottom chassis 100, the hemming structure according to the exemplary embodiment of FIG. 2 and the hemming structure according to the exemplary embodiment of FIG. 3 may coexist. For example, an edge among four edges of the bottom chassis 100 may have the hemming structure where the middle side wall portion 130 exists, and another edge may have the hemming structure where the middle side wall portion does not exist. For example, to reduce the left and right widths of the bezel while having the same screen size, the latter hemming structure may be applied to the left and right edges of the display device and the former hemming structure may be applied to the top and bottom edges of the display device.

Figure 4:
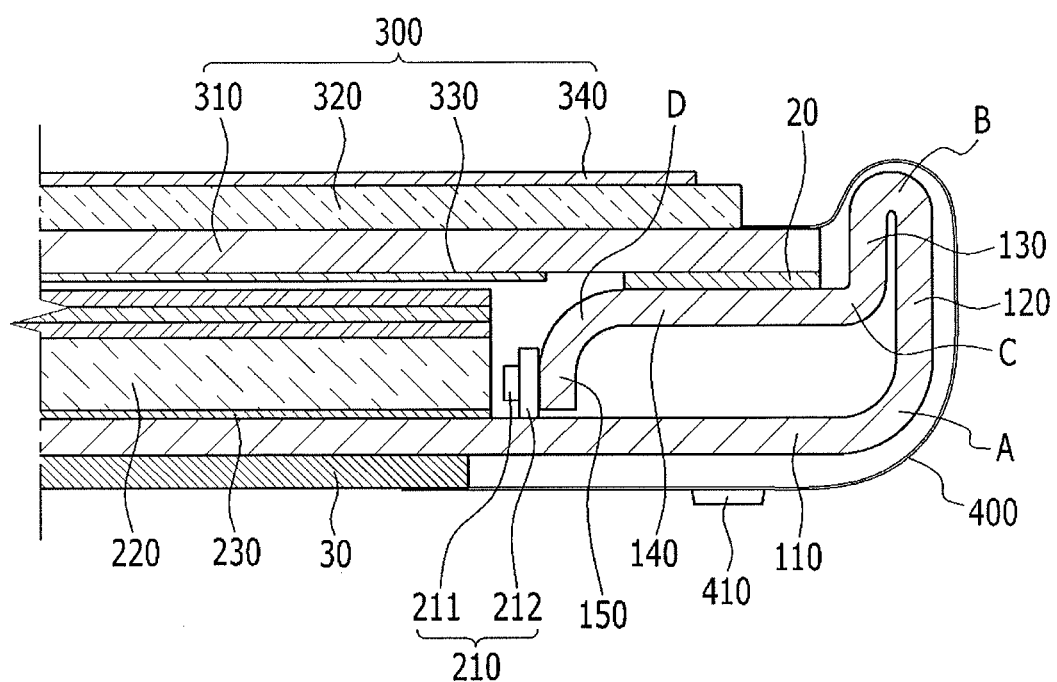
FIG. 4 illustrates a cross-sectional view of one example of a portion around an edge where the light source is disposed in the display device of FIG. 1.
Figure 5:
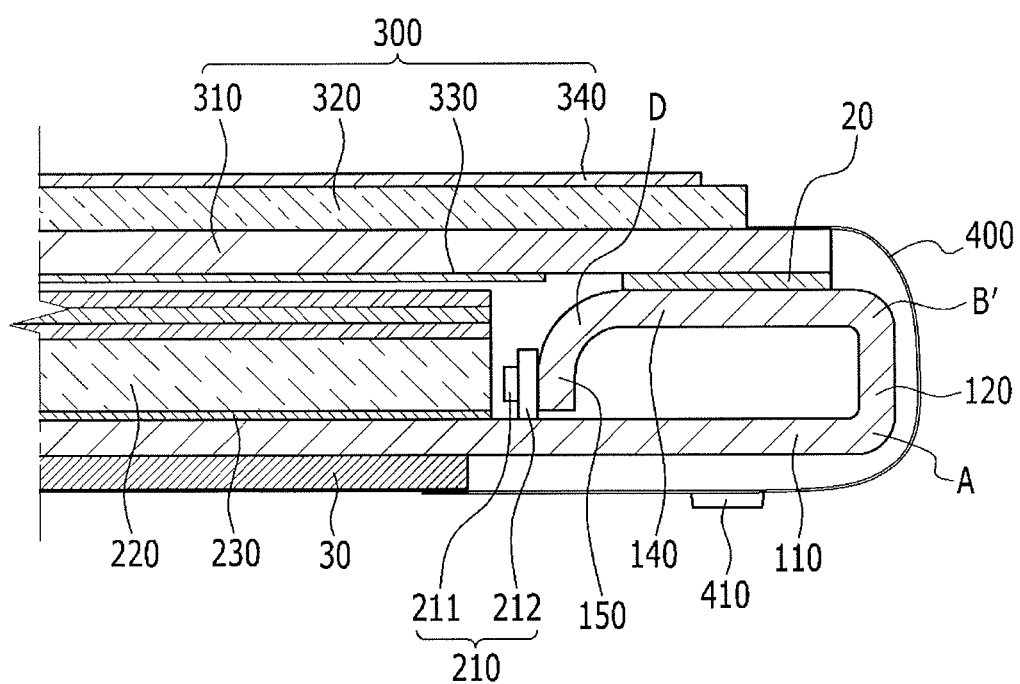
FIG. 5 illustrates a cross-sectional view of another example of a portion around the edge where the light source is disposed in the display device of FIG. 1.

FIG. 4 illustrates a cross-sectional view depicting an example of an edge where a light source 210 is located in the display device of FIG. 1 having a hemming structure as illustrated in FIG. 2, and FIG. 5 illustrates another example of an edge where the light source 210 is located in the display device of FIG. 1 having a hemming structure as illustrated in FIG. 3.

Referring to FIG. 4, a cross-section of an edge where a light source unit 210 is located in a display device having a bottom chassis 100 formed in a hemming structure may be the same as illustrated in FIG. 2. The light source unit 210 may be located at only one edge of the display device or may be located at a plurality of edges of the display device. When the light source unit 210 is positioned, a surface toward the inside at an inner side wall portion 150 of the bottom chassis 100 may almost contact a substrate 212 of the light source unit 210 rather than an end of a light guide plate 220.

Further, FIG. 4 illustrates a driving circuit substrate 400 connected with the end side of the display panel 300 to transmit a signal for driving the display panel 300. Such a connection of the driving circuit board 400 may be provided at only one edge or at a plurality of edges of the display device. In FIG. 4, connection portions of the light source unit 210 and the driving circuit board 400 are provided at the same edge, but in other implementations, the connection portions may be provided respectively at different edges.

One end of the driving circuit board 400 may be connected to an attachment portion at a lower substrate 310, which is a thin film transistor substrate of the display panel 300. The other end of the driving circuit board 400 may be connected to a printed circuit board 30 provided at a lower side of the bottom chassis 100 for supply of an external signal. A driving circuit 410, such as a data driving IC, may be mounted on the driving circuit board 400. The driving circuit 410 may be mounted toward an opposite side of the bottom chassis 100 or may be mounted toward the bottom chassis 100. The driving circuit board 400 may be a flexible printed circuit (FPC). When the driving circuit 410 is mounted, the driving circuit board 400 may be referred to as a chip on film (COF). The display device may include a shield cover to protect a portion of the driving circuit board 400 exposed to the outside of the bottom chassis 100 from damage.

Like the exemplary embodiment of FIG. 4, FIG. 5 illustrates a cross-sectional view of an edge where a light source unit 210 and a driving circuit board 400 are connected in the display device. In FIG. 5, a hemming structure of a bottom chassis 100 is similar to that illustrated in the exemplary embodiment of FIG. 3. In the exemplary embodiment illustrated in FIG. 4, a portion protruding upward (the upper portion of the external side wall portion 120 and the middle side wall portion 130) may be provided at an outer side of the attachment portion 140 of the bottom chassis 100. Thus, the portion near the second bent portion B may be significantly bent. Accordingly, connection between the driving circuit board 400 and the printed circuit board 30 provided at the lower side of the bottom chassis 100 may be difficult or the bent driving circuit board 400, which may follow the shape of the second bent portion B, may be subject to damage. On the other hand, when the bottom chassis 100 has a hemming structure that does not include such a protruding portion, as in FIG. 5, the driving circuit board 400 may be connected while being more gently bent. Advantages (e.g., a reduction of the width of the bezel) described in relation with the exemplary embodiment of FIG. 3 may be applied to the exemplary embodiment of FIG. 5.

Figure 6:
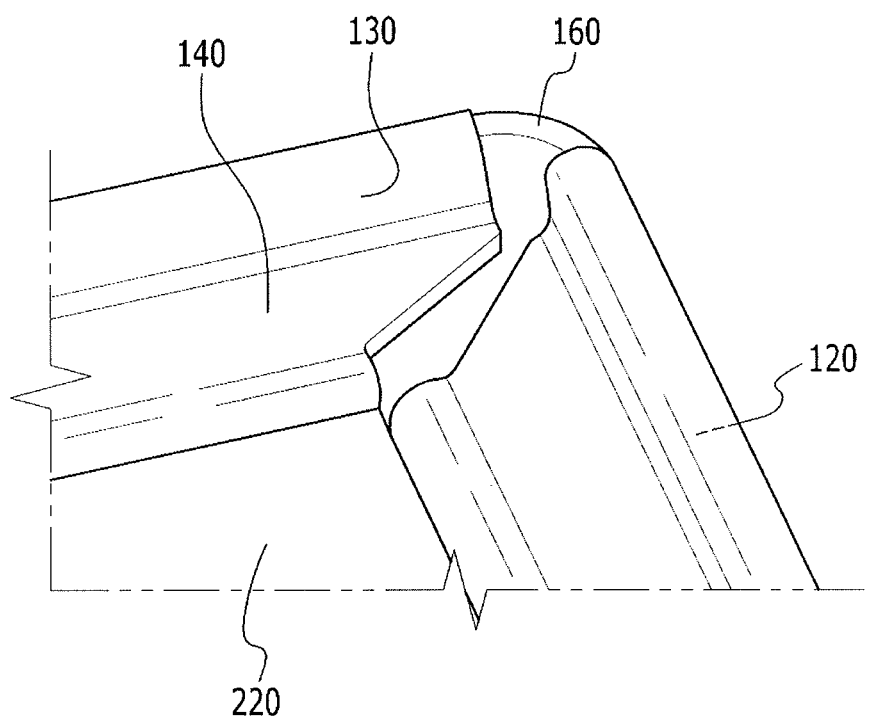
FIG. 6 illustrates a perspective view of one example of a portion where edges of a bottom chassis meet in the display device of FIG. 1.

FIG. 6 illustrates a perspective view of one example of a portion where edges of the bottom chassis meet in the display device of FIG. 1.

A hemming structure of the bottom chassis 100 may be formed by bending, for example, a metal plate. Light of the backlight unit 200 may leak between the hemming structures of neighboring edges. When the height of a corner 160 where the edges of the bottom chassis 100 meet is higher than the height of the attachment portion 140, light leakage may be reduced or prevented. FIG. 6 exemplarily illustrates that a location of the light guide plate 220 may be guided by the hemming structures of the bottom chassis 100.

By way of summation and review, a display panel of the liquid crystal display is non-emissive. Accordingly, a backlight unit (BLU) that provides light to the display panel is generally provided in the rear surface side of the display panel.

In general, in the liquid crystal display, the backlight unit is provided in a bottom chassis and the display panel is provided in an upper side of the backlight unit. In order to stably fix the display panel with a constant height, a cuboid mold frame of which a top portion and a bottom portion are opened may be provided between the backlight unit and the display panel. Such a mold frame may be closely attached to an inner surface or an outer surface of a side wall of the bottom chassis. The display panel is attached to a flat surface of the mold frame by a double-sided tape.

Recently, demand for a thin display device has increased. The size of the display device may be reduced while having the same screen size by forming the bezel at the edges of the display panel to be narrower.

Embodiments provide a display device that allows for a narrow width of a bezel. Embodiments further provide a display device that may prevent light leakage and that may have excellent bending strength.

The display device according to embodiments does not use a mold frame. and accordingly the width of a bezel can be narrowed. Although the width of the bezel is narrowed, the display panel can still be stably fixed, bending strength of the display device may be excellent, and light leakage may be prevented.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:

1. A display device, comprising:
   a bottom chassis;
   a backlight unit accommodated in the bottom chassis;
   a display panel above the backlight unit; and
   an adhesive sheet between the backlight unit and the display panel, the display panel being attached to the bottom chassis through the adhesive sheet,
   wherein the bottom chassis includes:
   a flat bottom portion forming a bottom surface of the bottom chassis;
   a first side wall portion extending upwardly from the flat bottom portion in a direction substantially perpendicular to the flat bottom portion;
   a second side wall portion extending downwardly from the first side wall portion substantially parallel to the first side wall portion;
   an attachment portion extending inwardly from the second side wall portion in a substantially horizontal direction, the adhesive sheet being directly attached to the attachment portion; and
   a third side portion extending downwardly from the attachment portion in a direction substantially perpendicular to the attachment portion.

2. The display device as claimed in claim 1, wherein:
   one side of the adhesive sheet adheres tri a peripheral area of the display panel, and
   another side of the adhesive sheet adheres to the attachment portion of the bottom chassis.

3. The display device as claimed in claim 1, rein the attachment portion of the bottom chassis is substantially parallel e display panel.

4. The display device as claimed in claim 1, wherein an upper surface of the attachment portion is located about even with or slightly higher than the upper surface of the backlight unit.

5. The display device as claimed in claim 1, wherein the first side wall extends to a height that is about even with or lower than the upper surface of the display panel.

6. The display device as claimed in claim 1, wherein, in the third side wall portion of the bottom chassis, an inward surface contacts or almost contacts the backlight unit.

7. The display device as claimed in claim 1, wherein a height of a corner where two edges of the bottom chassis meet is higher than the height of the attachment portion.

8. A display device, comprising
a bottom chassis;
a backlight unit accommodated in the bottom chassis;
a display panel above the backlight unit; and
an adhesive sheet between the backlight unit and the display panel, the adhesive sheet being directly attached to an attachment portion of the bottom chassis,
the display panel being attached to the bottom chassis through the adhesive sheet,
wherein:
at least one edge of the bottom chassis includes a first hemming structure including:
a flat bottom portion forming a bottom surface of the bottom chassis;
a first side wall portion extending upwardly from the flat bottom portion in a direction substantially perpendicular to the flat bottom portion; a second side wall portion extending downwardly from the first side wall portion substantially parallel to the first side wall portion;
the attachment portion, wherein in the first hemming structure, the attachment portion extends inwardly in a substantially horizontal direction from the second side wall portion; and
a third side wall portion extending downwardly from the attachment portion in a direction substantially perpendicular to the attachment portion, and
at least one other edge of the bottom chassis includes a second hemming structure including;
a flat bottom portion forming the bottom surface of the bottom chassis; a first side wall portion extending upwardly from the flat bottom portion in a direction substantially perpendicular to the flat bottom portion;
the attachment portion, wherein in the second hemming structure, the attachment portion extends inwardly substantially in a horizontal direction from the first side wall portion; and
another side wall portion extending downwardly from the attachment portion in a direction substantially perpendicular to the attachment portion.

9. The display device as claimed in claim 8, wherein a driving circuit substrate that transmits signals for driving the display panel is located in an edge of the bottom chassis including the second hemming structure.

* * * * *